July 22, 1969 R. B. GIBSON ET AL 3,457,550

AUTOMATIC HANDSHAKING METHOD AND APPARATUS FOR DATA TRANSMISSION SYSTEMS

Filed July 11, 1967 2 Sheets-Sheet 1

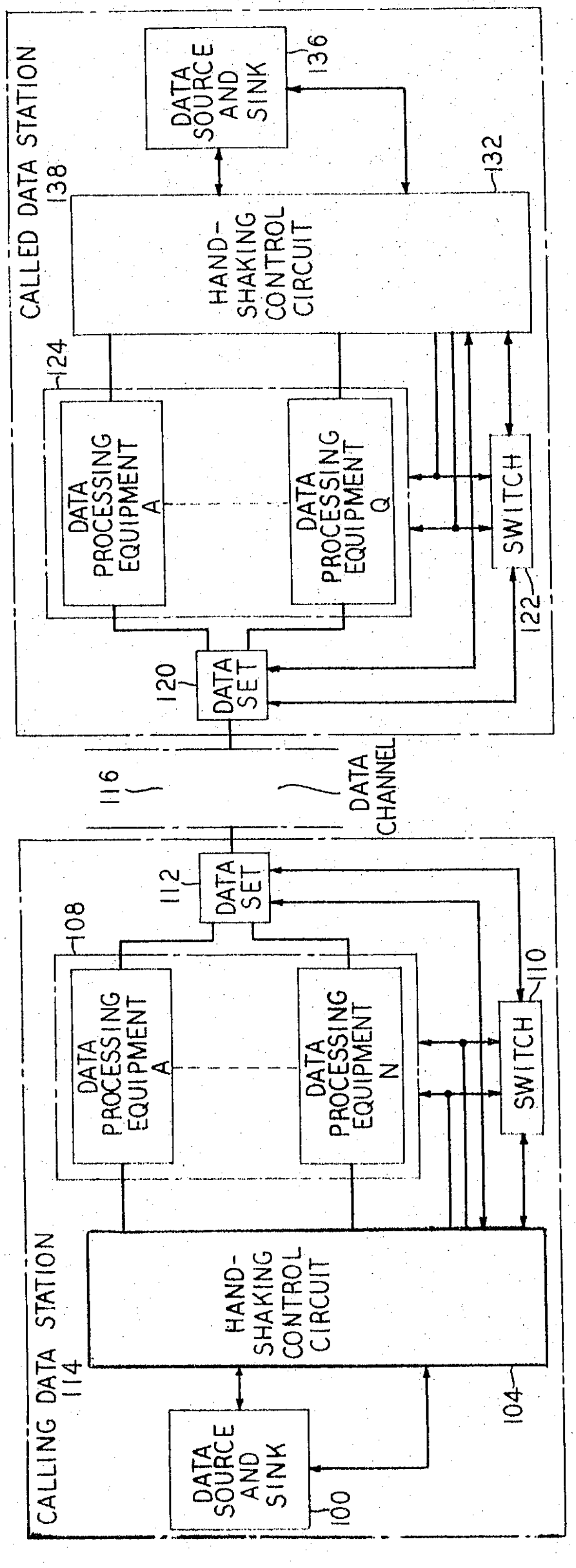

FIG. 1

FIG. 3

STATE 1 (SENT ENQ. LAST)

| STATION RECEIVES | STATION SENDS | NEXT STATE |
|---|---|---|
| ENQ. | RESPONSE 2 | 2 |
| RESPONSE 1 | RESPONSE 2 | 2 |
| RESPONSE 2 | RESPONSE 3 | 2 |
| RESPONSE 3 | RESPONSE 3 | 2 |

STATE 2 (SENT ACK. LAST)

| STATION RECEIVES | STATION SENDS | NEXT STATE |
|---|---|---|
| ENQ. | RESPONSE 1 | 1 |
| RESPONSE 1 | RESPONSE 1 | 1 |
| RESPONSE 2 | —— | 2 |
| RESPONSE 3 | —— | 2 |

INVENTORS R. B. GIBSON
D. A. KERR
T. E. LINDSAY
BY Lucian C. Canepa
ATTORNEY

United States Patent Office 3,457,550

Patented July 22, 1969

3,457,550

AUTOMATIC HANDSHAKING METHOD AND APPARATUS FOR DATA TRANSMISSION SYSTEMS

Richard B. Gibson, Little Silver, Douglas A. Kerr, Middletown, and Thomas E. Lindsay, Lincroft, N.J., assignors to Bell Telephone Laboratories, Incorporated, Murray Hill, N.J., a corporation of New York Filed July 11, 1967, Ser. No. 652,477
Int. Cl. H04q 5/00
U.S. Cl. 340—147 14 Claims

ABSTRACT OF THE DISCLOSURE

A handshaking technique is proposed for use in data communication systems in which the various data stations do not have the same capabilities. For example, the various data stations may be equipped with different error control capabilities. When a call is initiated between two data stations, the stations exchange sequences of signals which are utilized to selectively and automatically enable those equipments compatible with the capabilities of both stations. The called station transmits a first signal sequence to the calling station which identifies the called station's capabilities. The calling station registers this information and transmits a second signal sequence to the called station which identifies the calling station's capability. In response to the second signal sequence, the called station transmits an acknowledge signal to the calling station and enables that portion of its equipment which is compatible with the calling station's equipment. In response thereto, the calling station enables equipment which is compatible with that of the called station.

BACKGROUND OF THE INVENTION

Field of the invention

This invention relates to data communication systems and more particularly to such systems which employ automatic handshaking procedures between stations to establish communication links.

Description of the prior art

The complex data communication systems in current use generally comprise a plurality of data stations each equipped with the same capabilities both as regards transmission capabilities and data processing (e.g. error control) capabilities. One such system is described in T. L. Doktor, G. Parker, L. A. Weber, H. M. Zydney Patent 3,113,176, issued Dec. 3, 1963, in which Teletypewriter data stations are arranged to communicate by voice frequency signals over a telephone switching network. In this system, subscriber data transmission sets arranged to communicate by voice frequency signals are connected to subscriber lines extending from conventional telephone switching offices. Subscriber sets are provided with dial-listen only handsets and a ringer so that calls may be processed through the telephone switching network to a remote subscriber data set. When the called subscriber completes the call connection, supervisory connect signals are automatically interchanged to enable the data sets to communicate through the telephone switching network. This interchange of connect signals is sometimes referred to as handshaking.

In a system such as that described above, it may be desirable to equip certain of the data stations with various transmission or data processing capabilities while leaving the remaining data stations unmodified. In order for two data stations to communicate in such an arrangement, it would be necessary for each station to operate within the capabilities of the station with which it was to communicate. It would therefore be necessary for any two stations desiring to communicate to interchange information indicating to the other the capability of each and in response to this interchange to connect the appropriate equipments.

Summary of the invention

It is an object of the present invention, in view of the above described prior art, to provide in a data communication system which includes data stations having different transmission or data processing capabilities, an arrangement for automatically interchanging sequences of signals between any two data stations desiring to communicate to thereby condition each station to operate at the common capability of both stations.

It is another object of the present invention to provide an automatic handshaking arrangement which allows stations so equipped with the arrangement to operate with stations not so equipped.

These and other objects are illustrated in a specific system embodiment which includes a plurality of data stations some of which include equipments not contained by other of the stations. After a call has been initiated between two stations, the called station transmits a first signal sequence to the calling station which contains information identifying the capability or type of equipments contained by the called station. The calling station receives and registers this information and transmits a second signal sequence to the called station which contains information identifying the type of equipments contained by the calling station. Upon receipt of the second signal sequence the called station transmits an acknowledge signal to the calling station and enables that portion of its equipment which is compatible with the equipment of the calling station. Upon receipt of the acknowledge signal, the calling station enables that portion of its equipment which is compatible with the equipment of the called station. Thereby, the calling and called stations are conditioned to communicate with each other utilizing the highest transmission and/or data processing capabilities compatible with both stations.

Brief description of the drawings

A complete understanding of the present invention and of the above and other objects and advantages thereof, may be gained from a consideration of the following detailed description of a specific illustrative embodiment presented hereinbelow in connection with the accompanying drawing described as follows:

FIG. 1 shows a generalized data communication system including handshaking control circuitry made in accordance with the principles of the present invention;

FIG. 3 shows a logical state table representation of the handshaking control circuit of FIG. 2.

Detailed description

Figure 2:
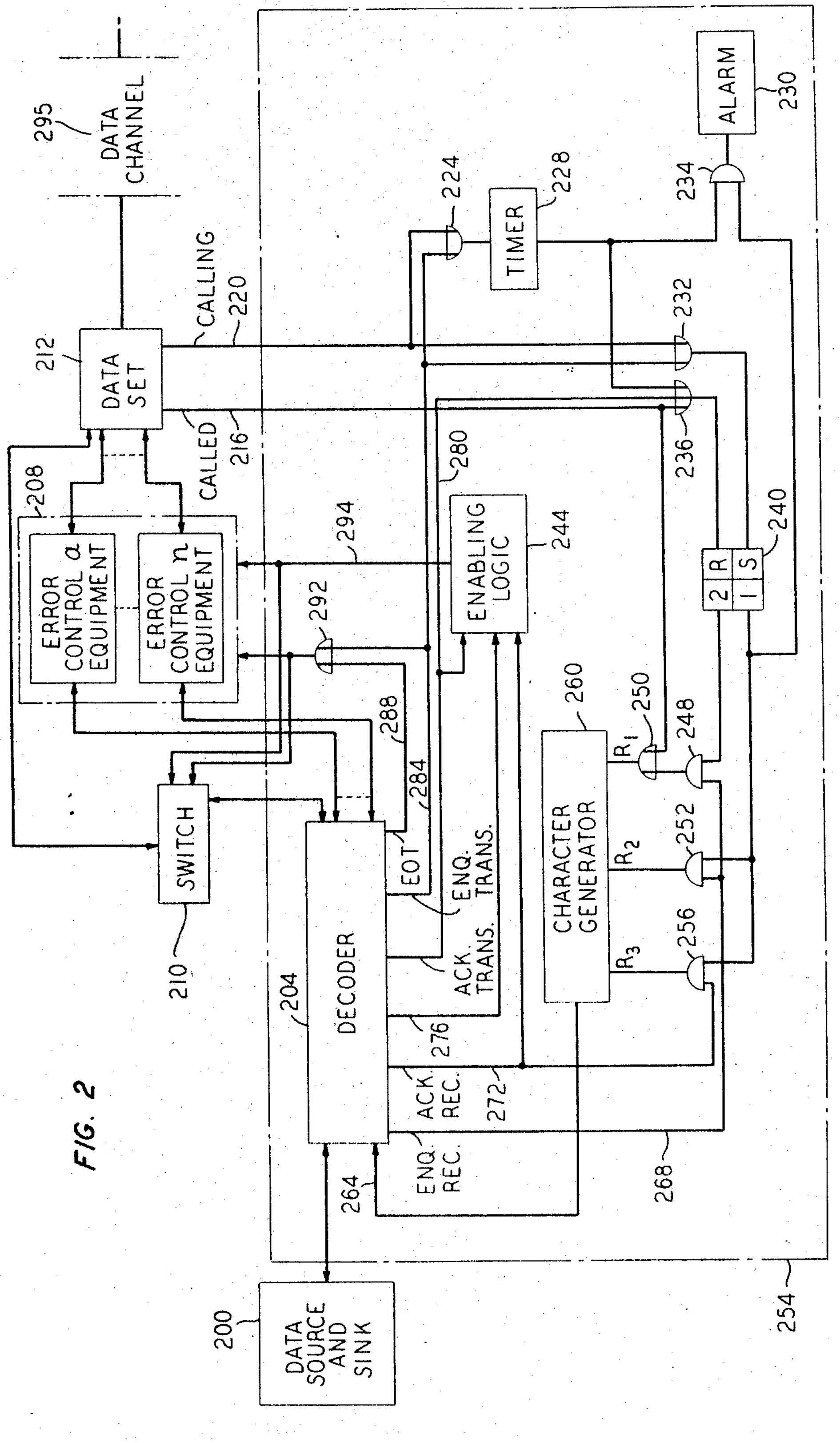
FIG. 2 shows one illustrative embodiment of the handshaking control circuits of FIG. 1.

Referring now to FIG. 1, there are shown two data stations (114 and 138) which may be considered as being part of a generalized data communication system. The leftmost station is illustratively identified as the calling station 114 and the rightmost as the called station 138. Each of the stations includes a data source and sink (100 and 136), a handshaking control circuit (104 and 132), various data processing equipments (108 and 124), a simple connecting and disconnecting switch (110 and 122), and a data set (112 and 120) for transmitting and receiving data over a data channel 116. The showing of various data processing equipments in FIG. 1 is exemplary of the fact that the various data stations may comprise different transmission or data processing capabilities. Furthermore, although data processing equipment is shown for each station of FIG. 1, some stations of the system may have no corresponding data processing capability whatever.

A connection between data stations is established in the usual manner as, for example, by the calling data station 114 going off-hook and dialing or signaling the called data station 138. (See Patent 3,113,176 cited earlier.) Each of the data sources and sinks 100 and 136 might advantageously comprise a teletypewriter and operator, a computer, or any device for generating and receiving data.

After a connection is established, the handshaking control circuit 132 of the called station generates a signal sequence containing information identifying the data processing capabilities of the called station and applies this sequence via the switch 122 to the data set 120 which, in turn, transmits the sequence via the data channel 116 to the calling station. The data sets 112 and 120 are advantageously of the type disclosed in previously cited Patent 3,113,176. The data set 112 receives the signal sequence and transfers it via the switch 110 to the handshaking control circuit 104. In response thereto, the handshaking control circuit 104 generates a second signal sequence which includes information identifying the data processing capability of the calling station and applies this sequence via the switch 110 to the data set 112 which in turn transmits it via the data channel 116 to the called station. The data set 120 receives this information and transfers it to the handshaking control circuit 132 which, in response to this signal, generates an acknowledge signal and applies it to the data set 120 and thereafter enables the particular data processing equipment 124 which is compatible with the data processing equipment of the calling station. The data set 120 transmits the acknowledge signal via the data channel 116 to the calling station. The data set 112 receives this signal and applies it to the handshaking control circuit 104 which then enables the data processing equipment 108 which is compatible with the data processing equipment of the called station. With the appropriate compatible data processing equipment now enabled, the data stations are in condition to communicate with each other.

It is well to emphasize that many of the data stations of the data communication systems in current use employ various handshaking procedures for initializing calls between stations. The signaling sequences used in such procedures typically contain information which identifies the two communicating data stations or which is used to enable certain of the data stations' equipment. In utilizing the present invention in such systems, it may be desirable to employ as much of the existing handshaking capability as is possible. Where this is the case, the handshaking control circuits 104 and 132 of FIG. 1 would monitor the handshaking sequences transmitted to and received by their associated data sources and sinks 100 and 136 and extract or insert information where appropriate to identify the capabilities of their respective data stations.

FIG. 2 shows detailed circuitry of the handshaking control circuits shown in FIG. 1. In describing the handshaking control circuit of FIG. 2 and the handshaking control procedure, the handshaking control circuit will at times be considered as being at the called station and at other times as being at the calling station. In this manner, two detailed showings of the handshaking control circuitry are avoided. In FIG. 2 the generalized data processing equipment represented in FIG. 1 is specified to constitute error control equipment.

The handshaking control circuit 254 is capable of generating the following three responses. Response 1 includes data characters which in this illustrative showing, identify the error control capability of the data station and ends in a data character which will be identified as ENQ. This response may also contain information identifying the data station in question and whatever other information may be desired. The ENQ character is used to indicate the end of response 1 and also to stimulate certain actions at the receiving station. Response 2 also includes data characters which identify the error control capability of the data station but differs from response 1 in that the response terminates with an ACK character. The ACK character is used to indicate the end of response 2 and also to stimulate certain actions at the receiving station. Response 2 may also contain other information such as the identity of the station, etc. Response 3 contains only the ACK character. The function of this response will be discussed fully when describing the operation of the handshaking control circuit 254.

The handshaking control circuit 254 is a two-state system, the state occupied at any particular time depending on whether an ENQ signal or an ACK signal was last transmitted by the associated data station. The state occupied by the handshaking control circuit 254 at any particular time is indicated by a flip-flop 240. As indicated in FIG. 2, when the flip-flop 240 is in the set state the control circuit is considered to be in state 1, and when the flip-flop 240 is in the reset state, the control circuit is considered to be in state 2. (FIG. 3 shows the logical state table of the handshaking control circuit 254. The state table will be explained later.)

FIG. 2 shows a data source and sink 200 connected to a data character decoder 204 which in turn is connected to a plurality of error control equipments 208 and to a switch 210. The error control equipments 208 and the switch 210 are connected to a data channel 295 via a data set 212. Various outputs of the decoder are connected to a character generator 260, enabling logic 244, the error control equipments 208, the state flip-flop 240, and a timer 228. The output of the character generator 260 is connected to the decoder 204. The output of the enabling logic 244 is connected to the error control equipments 208. The data set 212 is also connected to the timer 228 and the state flip-flop 240. The state flip-flop 240 in turn is connected to the character generator 260 and the timer 228. An alarm 230 is connected to the timer 228 and the state flip-flop 240.

After the initiation and establishment of a connection between two data stations (for example, by the procedure set forth in the previously-cited Patent 3,113,176), the handshaking procedure commences as follows. The data set 212 of the called station simultaneously resets the state flip-flop 240 via lead 216 and on OR gate 236 and signals the character generator 260 via an OR gate 250 to generate response 1. The input lead over which the character generator 260 is signaled to generate response 1 is identified as R1 in FIG. 2. In response to this signal, the character generator 260 generates response 1 and applies it via lead 264 to the decoder 204. The decoder 204 decodes each of the characters and then applies them via switch 210 to the data set 212 for transmission over the data channel 295 to the calling station. Upon detection of the ENQ character of response 1, the decoder 204 applies a signal via lead 284 (also labeled "ENQ TRANS.") and an OR gate 232 to the state flip-flop 240, thereby setting the flip-flop to state 1. The signal is also applied via an OR gate 224 to a timer 228 to set the timer to time for some predetermined interval. If the timer 228 times out, it applies a signal to the state flip-flop 240 via OR gate 236 thereby resetting the flip-flop to state 2.

The predetermined time interval specified by the timer 228 is of sufficient length to allow the completion of all handshaking procedures under normal conditions. Thus, a time-out generally indicates that some trouble conditions have been encountered. Forcing the handshaking circuit 254 into state 2 after a time-out, puts the circuit in condition to allow reinitiation of the handshaking procedure. In addition, a time-out when the state flip-flop 240 is in state 1 causes an alarm 230 to generate an alarm signal (e.g., audible or visual signal) which indicates a failure to complete the handshaking procedure. The handshaking procedure may be reinitiated by either of the data sources of a connection generating an ENQ character. This will be discussed later.

The same signal from the decoder 204 which sets the state flip-flop 240 and the timer 228 is also applied via an OR gate 292 to the error control equipments 208 to disable any equipments which may at that time be enabled and to a switch 210 to close or enable the switch. This feature is provided in connection with the reinitiation of the handshaking procedure. If the handshaking procedure has been completed and certain error control equipments enabled and the data source and sink 200 reinitiates the handshaking procedure by generating an ENQ character, the decoder 204 detects the ENQ character, disables the error control equipments, and enables the switch 210.

While the handshaking control circuit 254 at the called station is generating response 1 (described above), the data set 212 at the calling station applies a signal to the state flip-flop 240 via lead 220 and OR gate 232, thereby placing the state flip-flop in the set condition, i.e., in state 1. This signal, also applied via OR gate 224 to the timer 228, sets the timer to time for some predetermined interval (for the same reasons outlined above). After this takes place and after the called station has transmitted response 1 (and before the calling station has received response 1), the handshaking control circuits 254 at both the called and calling station are in state 1.

Response 1 is received via the data channel 295 by the data set 212 at the calling station and transferred via switch 210 to the decoder 204. The decoder then decodes response 1 and registers an indication of the error control capability of the called station (which information was, of course, contained in response 1) in the enabling logic 244 via lead 276 and applied a signal to lead 268 (also labeled ENQ REC.). This latter signal, in conjunction with a signal from the state flip-flop 240, by reason of the flip-flop being in state 1, enables an AND gate 252 which in turn signals the character generator 260 via the lead labeled R2 to generate response 2.

In response to the signal received from the AND gate 252, the character generator 260 generates response 2 and applies it to the decoder 204 via lead 264. The decoder decodes response 2 and applies it via switch 210 to the data set 212 to be transmitted via the data channel 295 to the called station. The decoder 204, upon decoding the ACK character which is the last character of response 2, signals the enabling logic 244 via lead 280 and registers therein an indication that the ACK character has been transmitted (the purpose of this will become clear later on). The decoder 204 also signals the state flip-flop 240 via lead 280 and OR gate 236 to reset the flip-flop to state 2. At this time the handshaking control circuit 254 of the calling station is in state 2 while the handshaking control circuit of the called station is in state 1. (This, of course, assumes that the timer 228 at the called station has not timed out.)

Response 2 is received via the data channel 295 by the data set 212 at the called station and transferred via switch 210 to the decoder 204. The decoder decodes response 2 and registers the error control capability indication of the calling station in the enabling logic 244 via lead 276. Upon decoding the ACK character of response 2, the decoder signals the enabling logic 244 via lead 272 and registers therein an indication that an ACK character has been received. The decoder, in conjunction with a signal from the state flip-flop 240 as a result of the flip-flop being in state 1, also enables an AND gate 256 which in turn signals the character generator 260 via the lead labeled R3 to generate response 3. The character generator 260 then generates response 3, which is simply the acknowledge character ACK, and applies it via lead 264 to the decoder 204. The decoder applies response 3 via switch 210 to the data set 212 for transmission via the data channel 295 to the calling station and thereafter signals the enabling logic 244 via lead 280 that an ACK character has been transmitted. This latter signal in conjunction with the enabling logic 244 having registered an indication that an ACK character was received, causes the enabling logic to enable the particular error control equipments 208 of the called station which are compatible with the equipments of the calling station. The enabling logic 244 has previously registered an indication of the error control capability of the calling station. The enabling logic simultaneously enables the error control equipments and disables or opens switch 210, thereby preparing the called station to transmit and receive data utilizing whatever degree of error control is compatible with both the called and calling stations. The decoder 204 also signals the state flip-flop 240 via lead 280 and OR gate 236 to place it in state 2.

The enabling logic 244 advantageously comprises a plurality of data flip-flops which, when enabled by the decoder, register an indication of the error control capabilities of the data station at the other end of the connection and an indication that the ACK character has either been transmitted or received. The outputs of these flip-flops coupled with the signal applied by the decoder via lead 280 (and also the signal applied via lead 272 as will be discussed hereinafter) are then utilized to enable the desired error control equipments and disable the switch 210. In particular, the enabling logic 244 enables the appropriate error control equipments and disables the switch 210 if (1) information concerning the error control capabilities of the data station at the other end of the connection has been received and (2) the ACK character has both been received and transmitted (or vice versa) by the data station in question.

Upon receipt of response 3 via the data set 212 and the switch 210, the decoder 204 of the calling station signals the enabling logic 244 via lead 272 to enable the appropriate error control equipments 208 compatible with the equipments at the called station and disable the switch 210. The indication of the error control capability of the called station had, of course, been registered previously after receipt of response 1 from the called station, as had the indication that an ACK character had been transmitted after transmission of response 2. Thus, both of the above noted conditions have been met for the enablement of the appropriate error control equipment and disablement of the switch 210. If one data station does not have the same error control capabilities as the other station, then, of course, that station only enables those equipments which are compatible with the equipments of the other station.

After the appropriate error control equipments in the calling station are enabled, the calling and called station are in condition to transmit and receive data. At the completion of the call the data source and sink 200 of the calling station transmits an end-of-transmission character—EOT—which the decoder 204 at both the calling and called data stations decodes and in response thereto disables the error control equipment via lead 288 and the OR gate 292 and enables or closes the switch 210. The calling and called stations are thereafter in condition to either initiate or receive calls from any other data station in the system.

As discussed earlier, if the handshaking procedure is not completed because of some type of trouble condition at least one of the data stations will, in general, be in state 1 which, in combination with a time-out by the timer 228, activates an alarm 230 and resets state flip-flop 240 to state 2. As also noted earlier, it may be desirable, when this occurs, to reinitiate the handshaking sequence for the purpose of seeing if the trouble condition has been eliminated. This can be done by either the called or the calling data source and sink 200 transmitting an ENQ character via the decoder 204, the switch 210, and the data set 212 to the data station at the other end of the connection. The decoder 204 at the data station from which the ENQ character was transmitted decodes the character and signals the state flip-flop 240 via lead 284 and OR gate 232, thereby setting the flip-flop to state 1. The decoder at the data station receiving the ENQ character also decodes the character and applies a signal via lead 268 which in conjunction with a signal from the state flip-flop 240 enables AND gate 248, thereby signaling the character generator 260 to generate response 1. Generation of response 1 was, of course, possible because the state flip-flop 240 had previously been reset to state 2 (if not already in that state) by a time-out of the timer 228. The handshaking procedure then proceeds as described earlier.

FIG. 3 shows a logical state table representation of the handshaking control circuitry. The various responses generated and the next states assumed by the handshaking control circuit in response to the different signaling sequences received are shown. For example, if the handshaking control circuit is in state 1 (having sent ENQ last) and receives response 3, then the control circuit generates and sends response 3 and assumes the "next state" of state 2. A careful examination of FIG. 2 will show that this in fact does occur. In particular, when the decoder 204 receives response 3 when the state flip-flop 240 is in state 1, the decoder applies a signal to lead 272 which, in conjunction with a signal from the state flip-flop 240, enables AND gate 256 which in turn signals the character generator 260 to generate response 3.

As discussed earlier, if existing data communication systems are modified by the incorporation of, for example, error control capabilities and the disclosed handshaking control circuit, and if such data communication systems are already equipped with handshaking capability, then it may be advantageous to utilize as much of the existing handshaking capability as possible. In such case, the handshaking control circuit would monitor the handshaking sequences generated by the data sources and sinks, and either delete or substitute characters necessary to accomplish the disclosed handshaking operation. Such an arrangement would also allow intercommunication between a data station equipped with the handshaking control circuit and a data station not so equipped. For example, the decoder of the handshaking control circuit of the equipped data station would monitor the handshaking sequence received from the nonequipped data station (generated by the data station's data source and sink) and decode the sequence to determine if any error control capability existed at the nonequipped data station. Failure of the decoder to detect a data character indicating the error control capability of the other station would reveal that the other station was not equipped with either error control capability or a handshaking control circuit. None of the error control equipment at the equipped station would then be enabled.

Another alternative arrangement to which the invention is applicable is a system in which a data station, although not equipped to perform any kind of error control, does have the ability to supply transmitted data characters with correct parity. If a call were initiated between a station of this type and a station which had the ability to detect incorrect parity and to make some kind of character substitution for any erroneous characters received (it is also assumed that this latter station would be equipped with handshaking control of the type disclosed), it would be desirable if the equipped station could determine the parity inserting capability of the other station without the necessity of equipping that station with handshaking control. This could be accomplished by requiring the handshaking control circuit of the equipped station to check the parity of a particular character of one of the handshaking sequences received from the other station. If correct parity were detected, this would indicate that the other station had the parity inserting capability, whereas if incorrect parity were detected this would indicate that the other station did not have the parity inserting capability. Thus, the necessity for requiring stations with parity inserting capabilities to have handshaking control circuitry of the type disclosed would be avoided.

It is noted that detailed circuit configurations for the units 108, 110, 124, 122, 204, 210, 108, 260, 228, and 230, shown in FIGS. 1 and 2, have not been given herein because their arrangements are considered to be clearly within the skill of the art. Illustrative configurations for implementing the units 100, 112, 120, and 136 in FIG. 1 and the units 200, 212, and 244 in FIG. 2 have already been discussed hereinabove.

What is claimed is:

1. A data communication system comprising a plurality of data stations and means for interconnecting said stations, each of said stations comprising a source of data signals, data transmission and receiving mean, a plurality of data processing equipments connected to said transmission and receiving means, some of which differ from the equipments of certain of the other of said data stations, and handshaking control means connected to said source and said transmission and receiving means including signal generating means for generating signals identifying the type of data processing equipments contained by said data station, decoding means for decoding both the signals generated by said signal generating means and equipment identifying signals received from other of said data stations, and logic means responsive to said decoding means for enabling specific ones of said equipments.

2. A combination as in claim 1 wherein said handshaking control means further comprises a bistable means responsive to said decoding means for residing in a first state following the generation by said signal generating means of a first signal and for residing in a second state following the generation by said signal generating means of a second signal.

3. A combination as in claim 2 wherein said handshaking control means further comprises means responsive to said decoding means and said bistable means for enabling said signal generating means to generate certain predetermined signal sequences.

4. A combination as in claim 3 wherein said handshaking control means further comprises a timing means for timing a predetermined period of time following the generation of said first signal and for resetting said bistable means to said second state after timing said predetermined period, and a trouble-indicating means responsive to said timing means and said bistable means for generating an audible or visual signal.

5. A data communication system comprising a plurality of data stations, some of which include error control equipments and means for interconnecting said stations, each of said stations comprising a source of data signals and data transmission and receiving means, and both of said stations having error control equipments, each further comprising handshaking control means connected to said source, to said data transmission and receiving means, and to said error control equipments and including signal generating means for generating signals identifying the error control equipments contained by said data station, decoding means for decoding both the signals generated by said signal generating means and data signals received from other of said data stations with which interconnections are established, and logic means responsive to said decoding means for enabling those error control equipments compatible with the equipments of said other stations.

6. A combination as in claim 5 wherein said handshaking control means further comprises bistable means responsive to said decoding means for residing in a first state following the generation by said signal generating means of a first signal and for residing in a second state following the generation of a second signal, and for joining with said decoding means to enable said signal generating means to generate certain predetermined signal sequences.

7. A combination as in claim 6 wherein said handshaking control means further comprises timing means for setting said bistable means to said second state after a predetermined period of time following the generation of said first signal, and trouble-indicating means responsive to said timing and said bistable means for generating an alarm signal at the termination of said predetermined period of time following the generation af said first signal if said bistable means is residing in said first state.

8. A data communication system comprising a plurality of data stations and means for interconnecting said stations, each of said stations comprising a source of data signals, data transmission and receiving means, a plurality of data processing equipments connected to said transmission and receiving means, some of which differ from the equipments of certain of the other of said data stations, signal generating means for generating a first, second, and third sequence of signals, the first two of which include information identifying the type of data processing equipments contained by said data station, decoding means for decoding signals received from said data source, from said data transmission and receiving means, and from said signal generating means, and logic means responsive to said decoding means receiving and decoding said first and third signal sequences or said second sequence for enabling certain of said data processing equipments.

9. A combination as in claim 8 wherein each of said data stations further comprises bistable means responsive to said decoding means for residing in a first state following the generation by said signal generating means of said first sequence and for residing in a second state following the generation of either of said second and third sequences, means for causing said signal generating means to generate said first signal sequence in response to said bistable means residing in said second state and said decoding means receiving and decoding either said first signal sequence or a specific predetermined signal from another of said data stations, means for causing said signal generating means to generate said second signal sequence in response to said bistable means residing in said first state and said decoding means receiving and decoding either said first signal sequence or said predetermined signal from another of said data stations, and means for causing said signal generating means to generate said third signal sequence in response to said bistable means residing in said first state and said decoding means receiving and decoding either said second signal sequence or said third signal sequence.

10. A combination as in claim 9 wherein each of said data stations further comprises timing means for setting said bistable means to said second state after a predetermined period of time following the generation of said first signal sequence, and means responsive to said timing means and said bistable means for generating an alarm signal at the termination of said predetermined period of time if said bistable means is residing in said first state.

11. In a data communication system comprising a plurality of data stations and means for interconnecting said stations, each of said stations comprising data processing equipments, some of which differ from certain of the data processing equipments of certain of the other of said data stations, a method for selectively and automatically enabling the compatible equipments of each of two data stations between which a call has been initiated comprising the steps of, the called station of said call transmitting to the calling station a first signal sequence identifying the type of data processing equipments contained by the called station, the calling station receiving said first signal sequence and in response thereto transmitting to the called station a second signal sequence identifying the type of data processing equipments contained by the calling station, the called station receiving said second signal sequence and in response thereto transmitting to the calling station a third signal sequence and enabling those of its equipments compatible with the equipments of the calling station, and the calling station receiving said third signal sequence and in response thereto enabling those of its equipments compatible with the equipments of the called station.

12. A method for selectively and automatically enabling certain equipments of each of two data stations desiring to communicate comprising the steps of a first station generating and transmitting to a second station to which it is connected a first signal sequence identifying the equipments of said first station, said second station receiving and decoding said first sequence and in response thereto generating and transmitting a second signal sequence to said first station identifying the equipments of said second station, said first station receiving and decoding said second signal sequence and in response thereto generating and transmitting to said second station a third signal sequence and enabling those of its equipments which are compatible with the equipments of said second station, and said second station receiving and decoding said third signal sequence and in response thereto enabling those of its equipments which are compatible with the equipments of said first station.

13. An arrangement for selectively and automatically enabling certain equipments of each of two data stations desiring to communicate, the first of said stations comprising first means for generating and transmitting to the second of said stations a first signal sequence identifying the equipments of said first station, said second station comprising a second means for receiving and decoding said first sequence and a third means responsive to said second means for generating and transmitting a second signal sequence to said first station identifying the equipments of said second station, said first station further comprising a fourth means for receiving and decoding said second signal sequence, a fifth means responsive to said fourth means for generating and transmitting to said second station a third signal sequence, and a sixth means responsive to said fourth means for enabling those equipments of said first station which are compatible with the equipments of said second station.

14. An arrangement as in claim 13 wherein said second station further comprises a seventh means for receiving and decoding said third signal sequence and an eighth means responsive to said seventh means for enabling those equipments of said second station which are compatible with the equipments of said first station.

References Cited

UNITED STATES PATENTS

| | | | |
|---|---|---|---|
| 1,848,291 | 3/1932 | Hitt | 178—22 |
| 3,253,262 | 5/1966 | Wilenitz et al. | 340—147 |
| 3,363,234 | 1/1968 | Erickson et al. | 340—172.5 |
| 3,113,176 | 12/1963 | Doktor et al. | |

DONALD J. YUSKO, Primary Examiner

U.S. Cl. X.R.

178—22; 179—18